June 6, 1961  L. E. YETTER  2,986,991
ELECTRIC COOKER
Filed July 28, 1959  2 Sheets-Sheet 1

Inventor.
Lloyd E. Yetter.
By M. F. Kellogg  Atty.

June 6, 1961
L. E. YETTER
2,986,991
ELECTRIC COOKER
Filed July 28, 1959
2 Sheets-Sheet 2
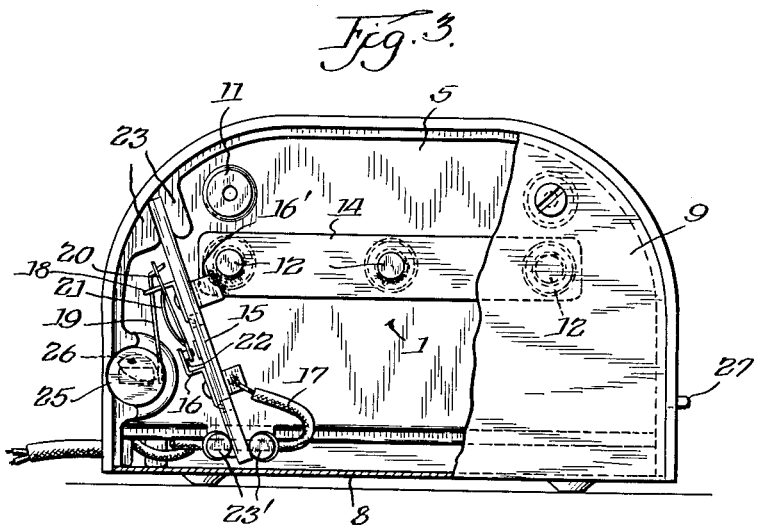
Fig. 3.
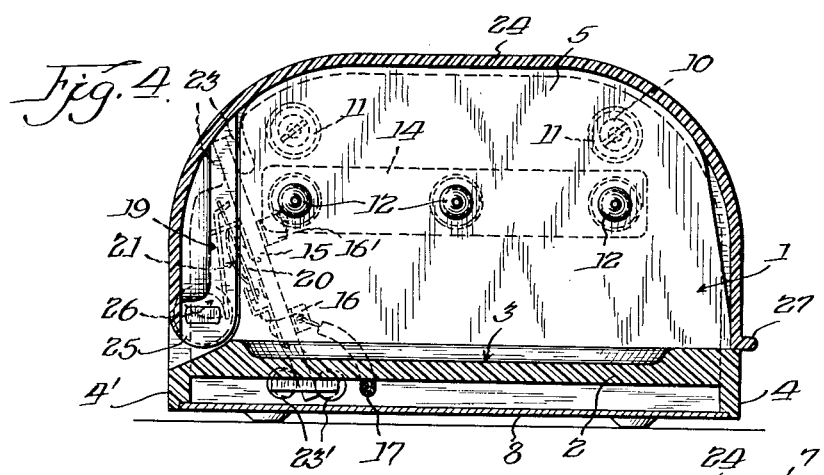
Fig. 4.
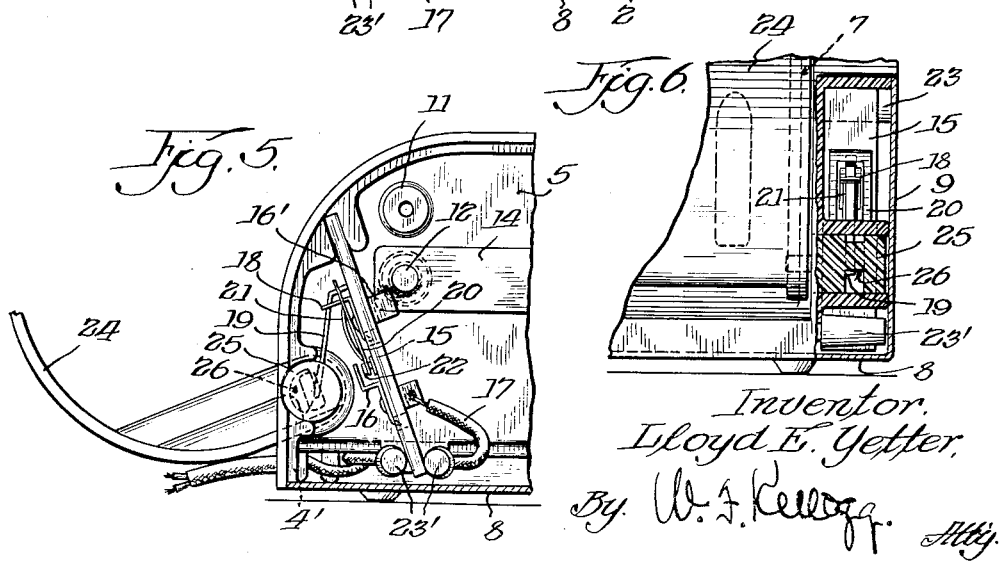
Fig. 5.
Fig. 6.
Inventor.
Lloyd E. Yetter,
By W. F. Kellogg
Atty.

# United States Patent Office 2,986,991
Patented June 6, 1961

2,986,991
ELECTRIC COOKER
Lloyd E. Yetter, Box 97, Colchester, Ill.
Filed July 28, 1959, Ser. No. 830,119
7 Claims. (Cl. 99—337)

This invention relates to improvements in electric cooking devices, more particularly, to an appliance for cooking various food stuffs, such for example, as moisture containing foods which may be in the form of frankfurters or similar preformed and preshaped moisture containing meats or meat products, being a continuation-in-part of the invention described and claimed in my United States patent numbered 2,889,765 issued June 9, 1959.

A principal object of the invention is to provide a novel form of housing or housing body for the cooking device capable of economical and rapid production in moldable plastic and of containing and supporting therewithin the active or working electrical components thereof in a manner which will assure their protection and prolonged satisfactory operation.

An equally important object of the invention is to provide the appliance with a dependable and novel form of means for activating and/or deactivating the electricity conducting components thereof, the same being automatically effected with closing and/or opening of its cover, e.g., electrically activated following the placement of food stuffs therein for cooking and closing of said cover, and deactivated when the cover is moved to its open position in order that the cooked food stuffs may be removed without hazard to a user.

Another and important object or feature of the invention resides in the novel swingable mounting of the appliance cover on its housing body, being constructed and effected in such a manner as will either "make" or "break" the electrical supply to the food stuff receiving, supporting and conducting components concurrently with its swinging, respectively, to a closed or to an open position.

Yet another object of the invention is to provide an electrical cooking appliance whose structural parts and working control components are of economical yet dependable character, capable of that rapid assembly necessary for so-called mass production.

Other features, objects and advantages of my invention will more fully appear from the following description of a preferred embodiment thereof in conjunction with the accompanying drawings, it being understood that while said invention is described by means of specific examples, its scope is not to be thereby limited except as defined in the following claims.

In the drawings:

FIGURE 3 is an end view of the same wherein the adjacent end wall of the casing is partly broken away to illustrate the swingable mounting of the cover member, the electrical circuit closing means and its operative connection with said mounting.

FIGURE 4 is a vertical transverse section taken on the line 4—4 of FIGURE 2, looking in the direction in which the arrows point.

FIGURE 5 is a fragmentary section similar in its taking to that of FIGURE 3, but wherein the appliance cover (fragmentally shown) is in its open position with the electrical supply circuit open or broken, and, FIGURE 6 is a fragmentary section taken on the line 6—6 of FIGURE 1, looking in the direction in which the arrows point.

Figure 1:
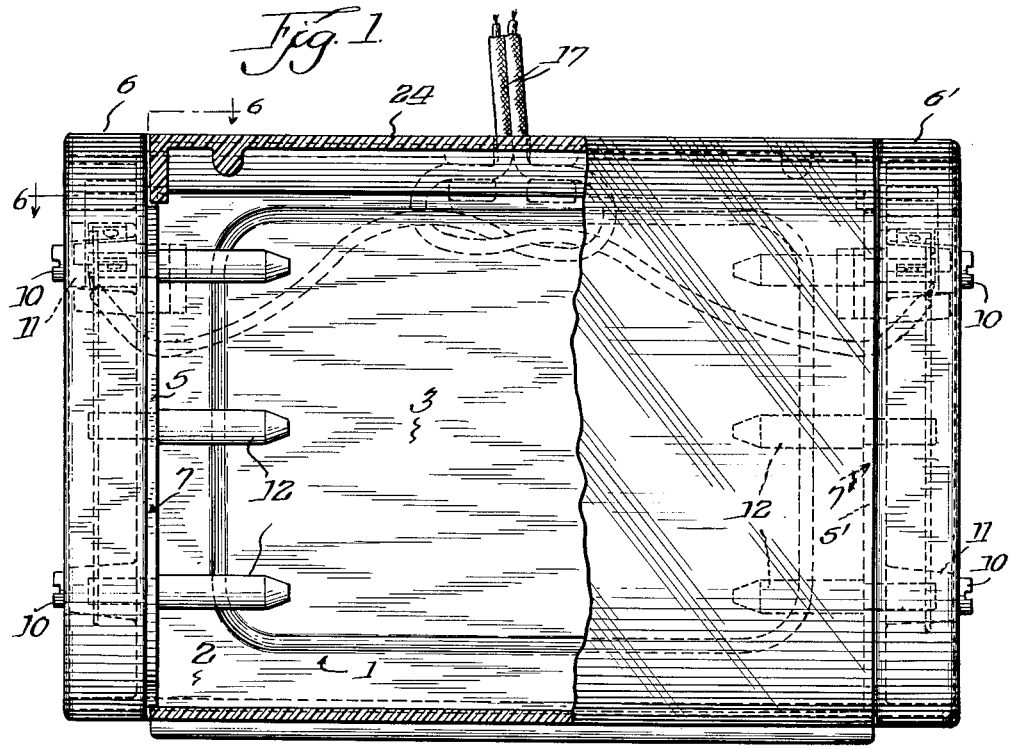
FIGURE 1 is a top view of the improved electric cooking appliance with the cover member shown closed and in section.

Referring in detail to the drawings, the numeral 1 generally indicates the appliance housing body which is cast, molded or otherwise formed in one piece from plastic or other suitable material, comprising a horizontal bottom 2 preferably dished, as at 3, front and side legs 4 and 4', and relatively spaced upstanding end walls 5 and 5' whose upper portions are preferably correspondingly curved or formed, as shown in FIGURE 3. The perimeter portions of the end walls are each formed with outwardly disposed flanges 6 and 6', each of which is inwardly shouldered, as at 7 and 7'.

A sheath or casing of suitable sheet material, including a bottom 8 and upstanding end walls 9 each corresponding in shape and size to the housing body end walls 5 and 5', nestingly receives said housing body therein with said end walls 9 adjacent and marginally seated in or on the outer extremities of the outwardly disposed flanges 6 and 6'. To secure this sheath or casing in the thus described relation to the housing body, its end walls and its outwardly disposed flanges, screws 10 are engaged through appropriate openings in the sheathing end walls and threadedly engage in and with bosses 11 integral with corresponding portions of the outer faces of the housing body end walls 5 and 5'.

Food stuff impaling electrodes 12 each consisting of a pin or pointed rod made of corrosion resistant metal, carbon, etc., are received in and horizontally supported by apertured bosses 13 integral with the outer sides of each of the housing body end walls 5 and 5' (see FIGURES 1 and 2) above its bottom 3. Said electrodes are equi-spaced one from the other and are arranged in paired and opposed relation. Because the housing body plastic is electrically nonconductive, the electrodes are relatively insulated. Bus-bars 14 are electrically connected to and across the inner ends of the electrodes and in turn, are each electrically connected to electric circuit closers, presently described.

Complemental electric circuit closing ("make" and "break") devices or switches such as manufactured by the Micro Switch Company of Freeport, Illinois, and marketed as their models SK1 and SK15 are provided and connected to each of the bus-bars 14. Each consists of a substantially rectangular base of insulating material 15 of appropriate length and width on which contact terminals 16 and 16' are mounted, the former having an electrical supply conductor 17 connected thereto and the latter being electrically connected to the bus-bar 14 adjacent thereto. A bracket 18 is fixedly mounted on the base in proximity to one end thereof and pivotally mounts an angularly formed switch lever 19. A longitudinally disposed switch arm 20 is also mounted adjacent one of its ends on the bracket 18 and is spring loaded by a relatively longitudinally disposed bowed leaf spring 21 having one end bearing on said bracket and its opposite end fixed to the free end portion of the switch arm adjacent its contact point 22, which, as will be noted, is positioned in cooperative relation to the contact terminal 16. Thus, as and when inward pivotal movement is imparted to the switch lever 19, the bowed spring 21 is placed under a tension sufficient to snap the switch arm to its closed or circuit making position. Conversely, when it is pivoted in the opposite (outward) direction, the tensioned bowed spring snaps the switch arm to its open or circuit breaking position.

The rectangular bases 15 of the circuit closing devices or switches are immovably mounted and supported adjacent the outer sides and normally rearward portions of the housing body end walls 5—5' by being bindingly or frictionally engaged between and with bosses or posts 23 and 23' integral with said outer sides. Thus, it will be seen that the switches will be contained, respectively, within the spaces or compartments between their adjacent housing body end walls, the upstanding walls 9 of the hereinbefore described sheath or casing, and the end wall outwardly disposed flanges 6—6'.

Figure 2:
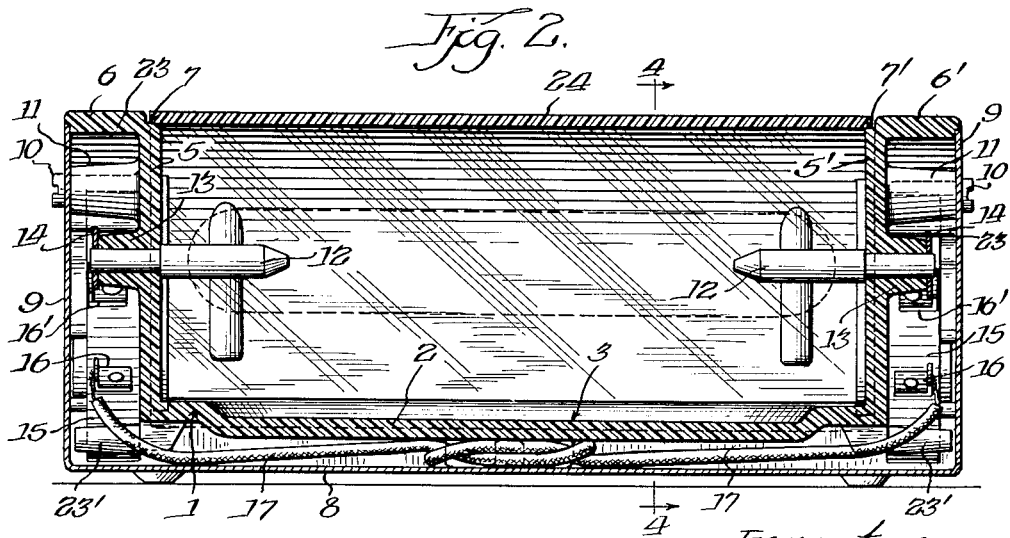
FIGURE 2 is a vertical longitudinal section through said appliance, again, with the cover in closed position.

In order that the housing body 1 and its end wall supported electrodes 12 may be enclosed, a cover 24, made of plastic or other suitable material, is provided, being of a cross-sectional shape and size corresponding to the curved body end walls 5—5' and of length such that when in its closed position, it will seat on the inwardly shouldered perimeter portions 7—7' thereof, as is shown in FIGURES 1 and 2 of the drawings. Relatively longitudinally opposed trunnions 25 are formed on and extend outwardly from the opposite and lower ends of one side of said cover, being journalled in appropriate bearing openings formed in adjacent portions of the housing body end walls 5—5' and extending for distances therebeyond. The extended portions of the trunnions are each formed with cam tracks 26 and are so disposed with relation to the free portions of the switch levers 19 as to be constantly individually spring bearingly engaged thereby in the manner shown in the FIGURES 3, 4 and 5.

The remaining or normally forward side of the cover is preferably outwardly flanged, as at 27, whereby to facilitate finger engagement therewith and its pivotal swinging, as required, to open or closed positions relative to the housing body.

The electric supply conductors 17 are extended from and beyond the housing body for a distance and have a conventional type of electrical contact fitting connected thereto, the same being engageable in or with a suitable electrical wall outlet fixture or other electrical supply source.

In usage of my improved cooker, and assuming that it is to be used for the cooking (roasting) of frankfurters or the like products, the cover 24 is pivoted to its open position, as indicated in FIGURE 5 of the drawings. Concurrently, the electrical switches, hereinbefore described, will function to "break" electrical circuit through the electrodes 12. At this time, frankfurters, etc., are endwise positioned between adjacent longitudinally paired electrodes 12 and their end portions are impaled on such electrodes. Thereupon, the cover 24 is pivoted to its closed position, as shown in the FIGURES 2, 3 and 4. Concurrently with such closing of the cover, the cover mounting trunnions 25 will be rotated. By reason of such rotation, their respective cam tracks 26 will permit relative outward swinging or pivoting of the switch levers 19 and thereby, the switch arms 20 will be springingly snapped to their closed positions, i.e., in electrical contact with their respective contact terminals 16. Thus, the electrodes 12 will be energized. Because of the moisture content of the impaled frankfurters, a degree of electrical conductivity will be accorded thereto. Such conductivity being of poor or of resistive character, however, will generate heat within the frankfurters of a degree entirely sufficient to effect their cooking or roasting.

With completion of the cooking of the frankfurters, the cover 24, of course, may be swung to its open position, affording access thereto. As and when said cover is swung to this open position, it will be borne in mind that the electrical circuit, hereinbefore described, will be broken or opened. Hence, a user of the device may, without hazard, remove the frankfurters from said electrodes.

I claim:

1. An electric cooker, comprising a housing body including a bottom and relatively spaced upstanding end walls, inwardly disposed article impaling electrodes on each of said walls in paired longitudinally opposed relation above said bottom, a cover receivable over the end walls and bottom, outwardly disposed longitudinally aligned trunnions on and connected to the opposite ends of the lower portion of one side of said cover, longitudinally aligned bearing means on corresponding portions of the end walls rotatably receiving and retaining said trunnions, one of the trunnions having a peripherally disposed cam track thereon, electric circuit closing means on that end wall adjacent the trunnion cam track electrically connected to said electrodes, and a lever connected to and extended from the circuit closing means having bearing engagement on said trunnion cam track whereby with rotation of the trunnion the lever will actuate said circuit closing means.

2. An electric cooker, comprising a housing body including a bottom and relatively spaced upstanding end walls, inwardly disposed article impaling electrodes on each of said walls in paired longitudinally opposed relation above said bottom, a cover receivable over the end walls and bottom, outwardly disposed longitudinally aligned trunnions on and connected to the opposite ends of the lower portion of one side of said cover, longitudinally aligned bearing means on corresponding portions of the end walls rotatably receiving and retaining said trunnions, cam means on one of said trunnions, electric circuit closing means on that end wall adjacent the trunnion cam means electrically connected to said electrodes, and means connected to the circuit closing means engageable with and operable by said cam means upon rotation of the trunnions whereby to actuate the circuit closing means.

3. An electric cooker, comprising a housing body including a bottom and relatively spaced upstanding end walls, inwardly disposed article impaling electrodes on each of said walls in paired longitudinally opposed relation above said bottom, a cover receivable over the end walls and bottom, outwardly disposed longitudinally aligned trunnions on and connected to the opposite ends of the lower portion of one side of said cover, longitudinally aligned bearing means on corresponding portions of the end walls rotatably receiving and retaining said trunnions, cam means on each of said trunnions, electric circuit closing means on each of the end walls adjacent the trunnions and cam means and electrically connected to said electrodes, and levers connected to and extended from the circuit closing means having individual bearing engagement on the trunnion cam means whereby with rotation thereof said levers will actuate said circuit closing means.

4. An electric cooker, comprising a housing body including a bottom and relatively spaced upstanding end walls, inwardly disposed article impaling electrodes on each of said walls in paired longitudinally opposed relation above said bottom, a cover receivable over the end walls and bottom, outwardly disposed longitudinally aligned trunnions on and connected to the opposite ends of the lower portion of one side of said cover, bearing means on corresponding portions of the end walls rotatably receiving and retaining said trunnions, each of said trunnions having a circumferentially disposed cam track thereon, electric circuit closing means on the end walls in proximity to the trunnion cam tracks electrically connected to said electrodes, and means connected to the circuit closing means engageable with the trunnion cam tracks whereby with rotation of the same said means will actuate said circuit closing means.

5. An electric cooker, comprising a one piece housing body including a bottom and relatively spaced upstanding end walls, portions of said end walls having outwardly disposed flanges thereon, a casing consisting of a bottom and relatively spaced upstanding end walls nestingly receiving said housing body therein, the end walls of said casing covering the end walls of said housing body and engaged with the marginal portions of the flanges thereon, inwardly disposed article impaling electrodes on each of said housing body end walls in paired longitudinally opposed relation above the housing body bottom, a cover receivable over the housing body end walls and bottom thereof, outwardly disposed longitudinally aligned trunnions on and connected to the opposite ends of the lower portion of one side of said cover, longitudinally aligned bearing means on corresponding portions of the housing body end walls rotatably receiving and retaining said trunnions, the trunnions each having peripherally disposed cam means thereon, electric circuit closing means on the housing body end walls in proximity to the trunnion cam means and electrically connected to said electrodes, and levers connected to and extended from the circuit closing means constantly engaging said cam means whereby with rotation of the trunnions said levers will actuate said circuit closing means.

6. An electric cooker, comprising a housing body including a bottom and relatively spaced upstanding end walls, inwardly disposed article impaling electrodes on each of said walls in paired longitudinally opposed relation above said bottom, a cover engageable over the body end walls and bottom having trunnions on the opposite ends of the lower portion of one side thereof journaled in bearings on corresponding portions of the body end walls, electric circuit closing means mounted on and within the body electrically connected to said electrodes, and means on and rotatable with at least one of said trunnions engageable with the circuit closing means whereby to actuate and close the same concurrently with movement of the cover to its closed position relative to the body.

7. An electric cooker, comprising a housing body including a bottom and relatively spaced upstanding end walls, inwardly disposed article impaling electrodes on each of said walls in paired longitudinally opposed relation above said bottom, a cover engageable over the body end walls and bottom, said cover being pivotally mounted at the opposite ends of the lower portion of one side thereof on corresponding portions of the body end walls, electric circuit closing means mounted on and within the body electrically connected to said electrodes, and an arm operatively associated with a portion of the cover in proximity to its pivotal mounting on said end walls and engageable with said circuit closing means whereby to actuate and close the same concurrently with pivoting of the cover to its closed position relative to the body.

References Cited in the file of this patent

UNITED STATES PATENTS

| | | |
|---|---|---|
| 1,993,353 | Young | Mar. 5, 1935 |
| 2,052,919 | Brogdon | Sept. 1, 1936 |
| 2,889,765 | Yetter | June 9, 1959 |
| 2,896,527 | Richman | July 28, 1959 |